US011011811B2

(12) United States Patent
Xie

(10) Patent No.: US 11,011,811 B2
(45) Date of Patent: May 18, 2021

(54) LOW VOLTAGE BATTERY PROTECTOR

(71) Applicant: Rui Xie, Shenzhen (CN)

(72) Inventor: Rui Xie, Shenzhen (CN)

( * ) Notice: Subject to any disclaimer, the term of this patent is extended or adjusted under 35 U.S.C. 154(b) by 256 days.

(21) Appl. No.: 16/362,832

(22) Filed: Mar. 25, 2019

(65) Prior Publication Data

US 2020/0313149 A1 Oct. 1, 2020

(51) Int. Cl.
*H01M 50/572* (2021.01)
*B60L 50/64* (2019.01)
*B60L 58/12* (2019.01)
*H02J 7/00* (2006.01)
*H01M 50/543* (2021.01)

(52) U.S. Cl.
CPC .......... *H01M 50/572* (2021.01); *B60L 50/64* (2019.02); *B60L 58/12* (2019.02); *H01M 50/543* (2021.01); *H02J 7/0031* (2013.01); *H02J 7/00306* (2020.01)

(58) Field of Classification Search
CPC ............. H01M 6/5044; H01M 50/574; H01M 50/583; H01M 50/584; H01M 50/586; H01M 50/588; H01M 50/59; H01M 50/591; H01M 50/593; H01M 50/595; H01M 50/597; H01M 50/572; H01M 50/543; H01M 50/00; B60L 50/64; B60L 58/12; H02J 7/0031; H02J 7/00306; H02J 7/0045; H02J 2310/46; Y02E 60/10
USPC ........................................................ 320/136
See application file for complete search history.

(56) References Cited

U.S. PATENT DOCUMENTS

| | | | | |
|---|---|---|---|---|
| 4,149,093 A | * | 4/1979 | D'Alessio .............. | H01H 73/44 307/10.7 |
| 5,612,659 A | * | 3/1997 | Kerber ................ | H01M 50/572 335/177 |
| 6,291,970 B1 | * | 9/2001 | Miller ................. | H01M 50/209 320/112 |
| 6,503,647 B1 | * | 1/2003 | Sugiyama ........... | H01M 50/502 429/7 |
| 6,830,490 B2 | * | 12/2004 | Murakami ........... | H01R 11/282 439/755 |
| 8,179,092 B2 | * | 5/2012 | Timmons ............ | H01M 10/425 320/112 |
| 9,685,801 B2 | * | 6/2017 | Lim ...................... | H02J 7/0042 |
| 10,446,816 B2 | * | 10/2019 | Lee ......................... | B60L 50/66 |

(Continued)

FOREIGN PATENT DOCUMENTS

WO 2018094449 A1 5/2018

*Primary Examiner* — M Baye Diao
(74) *Attorney, Agent, or Firm* — IPro, PLLC; Na Xu

(57) ABSTRACT

The present invention discloses a low voltage battery protector, interposed between a battery and a cable connected thereto, including: a main body having an upper end, a lower end substantially opposite to the upper end, and a frame connecting the upper end to the lower end. The frame further includes a mounting surface. The protector incudes a first contact extending from the top end; a supporting portion extending substantially perpendicularly from the mounting surface; a second contact assembled with the supporting portion. The second contact includes a connecting portion pivotally assembled with the supporting portion. Such a low voltage battery protector provides the user with great flexibility and convenience to choose an adaptive position to mount the protector, and provides the user with more space to mount the protector.

9 Claims, 5 Drawing Sheets

(56) References Cited

U.S. PATENT DOCUMENTS

| | | | |
|---|---|---|---|
| 2001/0051469 A1* | 12/2001 | Murakami | H01R 11/287 |
| | | | 439/755 |
| 2011/0244280 A1* | 10/2011 | Byun | H01M 10/0587 |
| | | | 429/61 |
| 2016/0329550 A1* | 11/2016 | Kohlberger | H01M 50/3425 |
| 2020/0328395 A1* | 10/2020 | Trautmann | H01M 50/172 |

* cited by examiner

200
LOW VOLTAGE BATTERY PROTECTOR

FIELD OF THE PRESENT DISCLOSURE

This invention relates to batteries and in particular to a low voltage battery protector containing control circuit arrangement for preventing excessive discharge of a battery.

DESCRIPTION OF RELATED ART

The following discussion of the background art is intended to facilitate an understanding of the present invention only. It should be appreciated that the discussion is not an acknowledgement or admission that any of the material referred to was part of the common general knowledge as at the filing date of the application.

Various solutions have been proposed to solve the problem of being unable to start a motor vehicle when the 12 volt lead acid battery fails. This can be due to excessive discharge or age resulting in the battery reaching a condition where it has insufficient capacity to operate the starter motor in order to start the internal combustion engine.

One solution to this problem has entailed protection against over discharge built into non-essential accessories. An example of this is a low voltage cut-out built into car fridges such as the type sold under the trade mark Engel. These are popular with camping enthusiasts who go off-road, and in these circumstances, it is important to be able to start the vehicle in a situation where one may be remote from civilization and help, in the event of such a breakdown. This type of cut-out would work well in older vehicles having no other circuits that would continue to draw on the battery, and as a consequence, modern vehicles with their heavy dependence on electronics that continue to operate when the vehicle is not operating, are not saved by such arrangements.

A PCT patent application WO2018094449A1 provides a battery cut-out device which can be connected to a battery. The battery cut-out device is a flat box with a contact electrically connected to a positive electrode of a battery and another contact electrically connected to other electronic devices via a cable. The device is a box, and the only connection between the device and the battery is the mechanically connection achieved by the contact and the positive electrode. It is obvious that the relationship between the cut-out device and the battery is unstable, and the connection between the device and the battery can be easily broken due to unexpected shock and longtime use. Further, Due to the limited space where the battery locates, it's difficult to install the cut-out device to the battery. And in some cases, the positive electrode is covered by other components, which increases the difficulty for a user to install the cut-out device.

Therefore, the present disclosure is desired to seek an improved low voltage battery protector for protecting the battery against over-discharge, and further for solving the problems or disadvantages mentioned above.

SUMMARY OF THE PRESENT DISCLOSURE

This disclosure is primarily intended for automotive applications, but will also have application in stationary battery applications.

The disclosure seeks to provide an alternative arrangement for users of vehicles or other critical systems to protect the battery against over-discharge.

In a broadest embodiment the present disclosure will provide an arrangement in an automotive application, which will operate to protect a user against being stranded with an internal combustion engine powered vehicle that they cannot start, due to there being insufficient charge to operate the starter motor.

Accordingly, the present disclosure provides a low voltage battery protector interposed between a battery and a cable connected thereto. The protector includes a main body having an upper end, a lower end substantially opposite to the upper end, and a frame connecting the upper end to the lower end. The frame further includes a mounting surface. The protector includes a first contact extending from the top end; and a supporting portion extending substantially perpendicularly from the mounting surface. A second contact is assembled with the supporting portion, and includes a connecting portion pivotally assembled with the supporting portion.

The present disclosure also provides a battery protection terminal, including: a battery having a top, a bottom opposite to the top, a plurality of sides connecting the top to the bottom, a positive electrode and a negative electrode respectively formed on the top; a low voltage battery protector, having a main body with a mounting surface attached to one of the sides, a first contact extending from the main body for electrically connecting to an accessory, a supporting portion extending perpendicularly from the mounting surface, and a second contact pivotally connecting to the supporting portion and electrically connecting to the positive electrode.

By virtue of this disclosure, a user is provided with great flexibility to choose an adaptive position to mount the protector.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure hereinafter is described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure. Throughout the specification unless the context requires otherwise, the words "comprise" or "include" and corresponding variations such as "comprises" or "comprising", or "including" "includes", will be understood to imply the inclusion of a stated integer or group of integers but not the exclusion of any other integer or group of integers.

Figure 1:
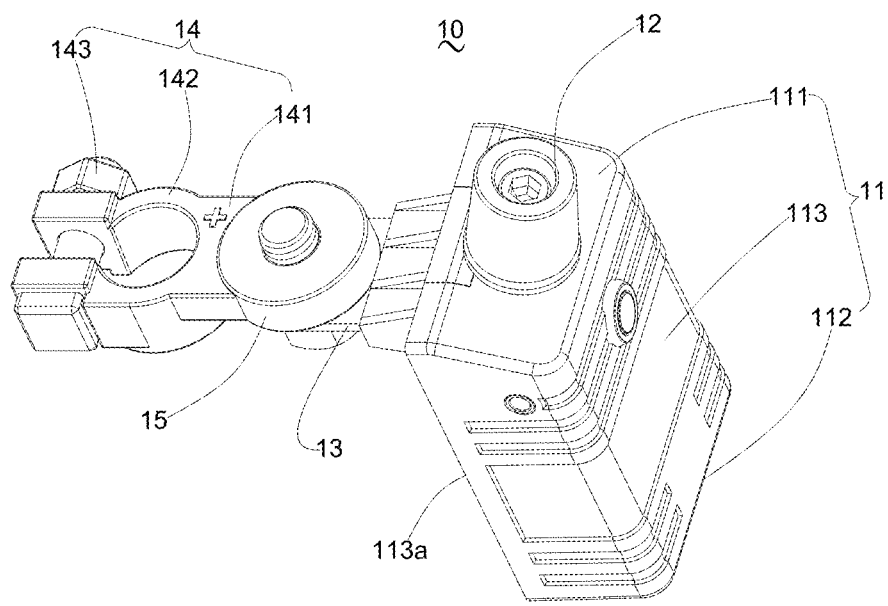
FIG. 1 is an isometric view of a low voltage battery protector, in accordance with an exemplary embodiment of the present disclosure.

Referring to FIG. 1, the present disclosure provides a low voltage battery protector 10, in accordance with an exemplary embodiment, includes a main body 11 and a first contact 12 extending from the main body 11. The main body 11 further comprises an upper end 111 from which the first contact 12 extends upwardly, a lower end 112 substantially opposite to the upper end 111, and a frame 113 connecting the upper end 111 to the lower end 112. The frame 113 of the main body 11 further includes a mounting surface 113a.

Extending from the mounting surface 113a, the low voltage battery protector 10 further comprises a supporting portion 13. In addition, the low voltage battery protector 10 includes a second contact 14. The second contact 14 is provided with a connecting portion 141 connecting to the supporting portion 13, a clamp 142 extending from the connecting portion 141, and a first fastening member 143 cooperating with the clamp 142. In the present embodiment, the first fastening member 143 is an assembly of a screw and a nut.

Figure 2:
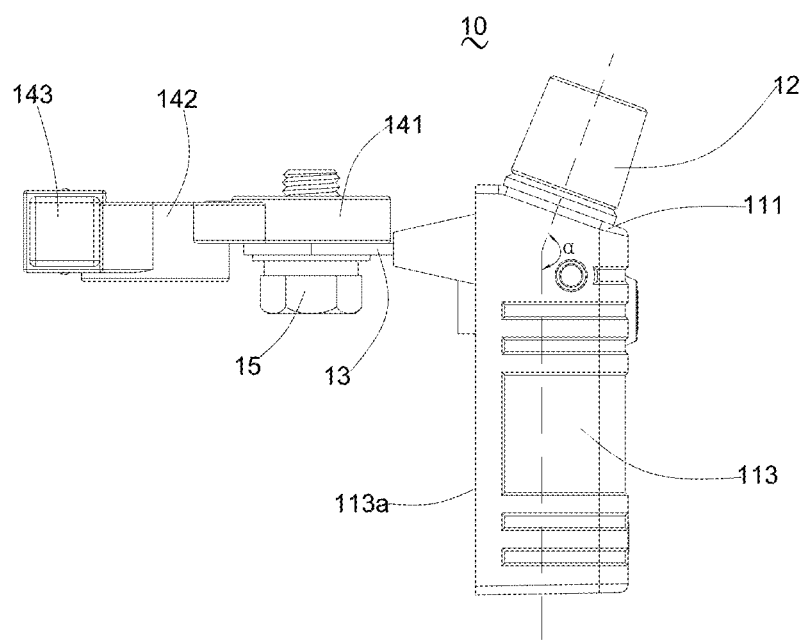
FIG. 2 is a front view of the low voltage battery protector in FIG. 1.

Referring to FIG. 2, together with FIG. 1, the connecting portion 141 is pivotally connected to the supporting portion 13 by a second fastening member 15. In the present embodiment, the second fastening member 15 is a screw and a nut. By virtue of such configuration, the connecting portion 141 is rotatable relative to the supporting portion 13, by which, a user is able to rotate the connecting portion 141 with respect to the supporting portion 13 by release the second fastening member 15, and fasten the second fastening member 15 after the connecting portion is rotated to a desired position.

As shown in FIG. 2, an obtuse angle α is formed between an axis of the first contact 12 and a plane where the mounting surface 113a locates. In this embodiment, the upper end 111 is a slope relative to the mounting surface 113a, and the first contact 12 extends perpendicularly from the upper end 111, thus, the first contact 12 forms an obtuse angle with respect to the mounting surface 113a.

Figure 3:
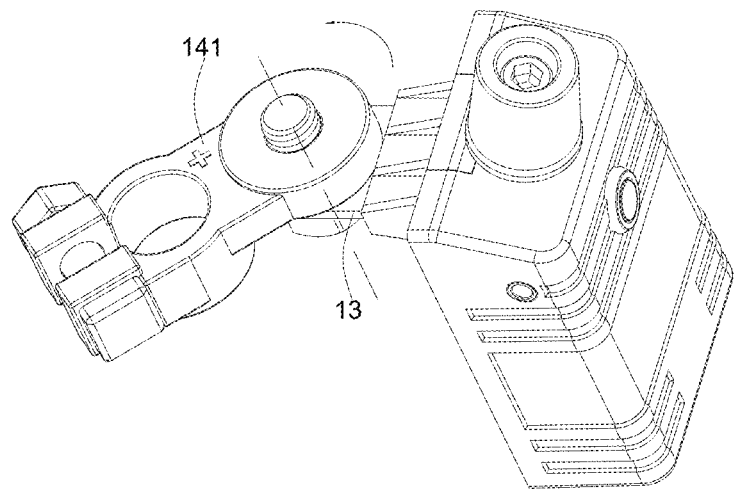
FIG. 3 is similar to FIG. 1, indicating one exemplary working state of the low voltage battery protector.
Figure 4:
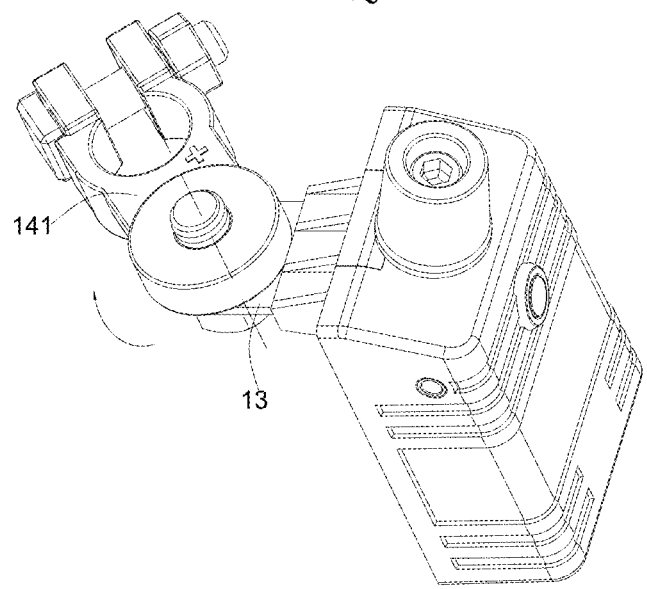
FIG. 4 is similar to FIG. 3, indicating another exemplary working state o the low voltage battery protector.

Referring to FIG. 3, compared to FIG. 1, the connecting portion 141 is rotated about the supporting portion 13 to a new position by rotating along a counter-clockwise direction. And referring to FIG. 4, the connecting portion 141 is rotated about the supporting portion 13 to a new position by rotating along a clockwise direction. The advantage of such a configuration of rotatable connecting portion 141 will be described below for making it clear how the low voltage battery protector 10 engages with the battery.

Figure 5:
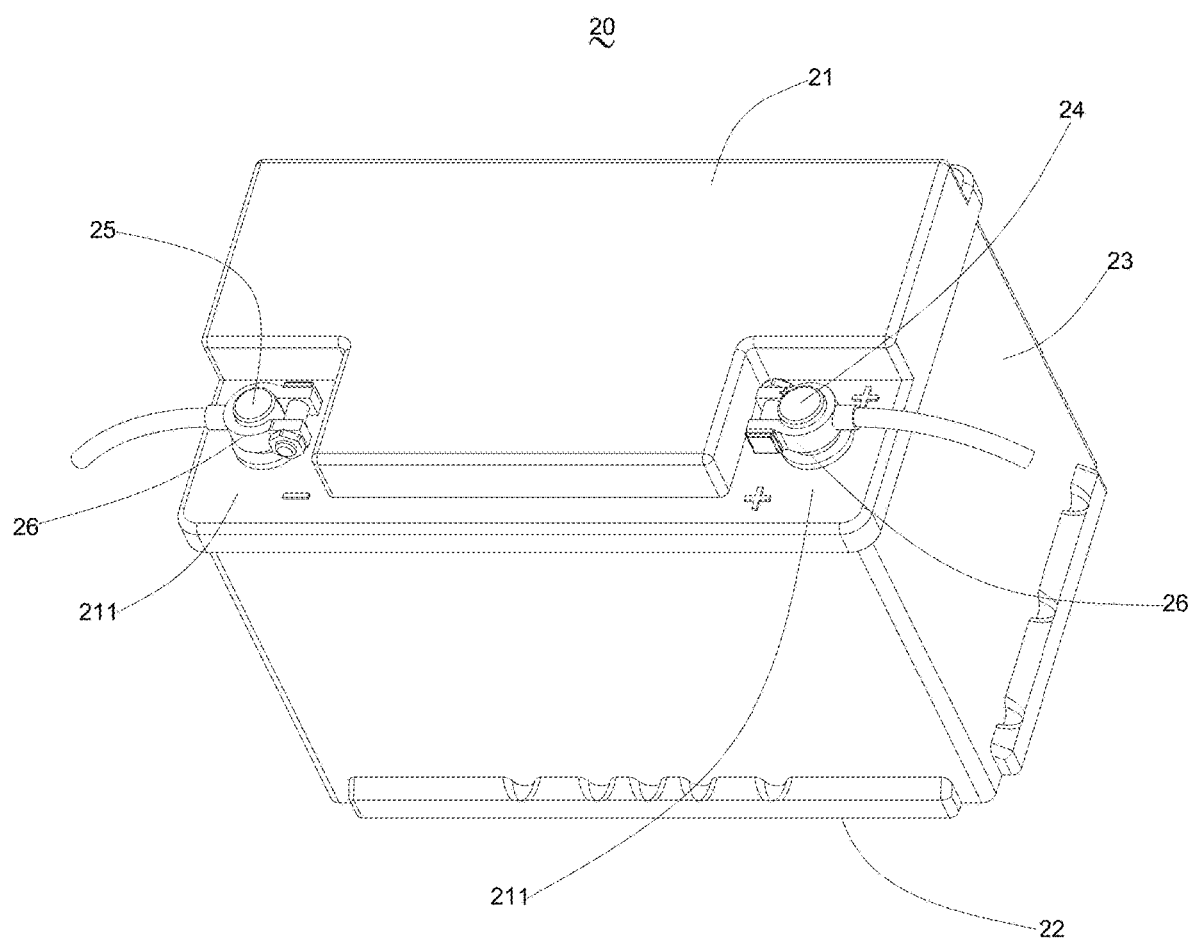
FIG. 5 is an isometric view of a battery, with which the low voltage battery protector of the present disclosure will engage.

Referring to FIG. 5, a battery 20 with which the low voltage battery protector 10 engages is a typical battery used in an automotive applications. The battery 20 includes a top 21, a bottom 22 opposite to the top 21, and a four sides 23 extending from the top 21 to the bottom 22, which makes the battery a cuboid. The top 21 of the battery 20 defines a pair of recesses 211. A positive electrode 24 is arranged in one of the recesses 211, and a negative electrode 25 is arranged in the other recess 211. Besides, the battery 20 includes at least two battery clamps 26.

Figure 6:
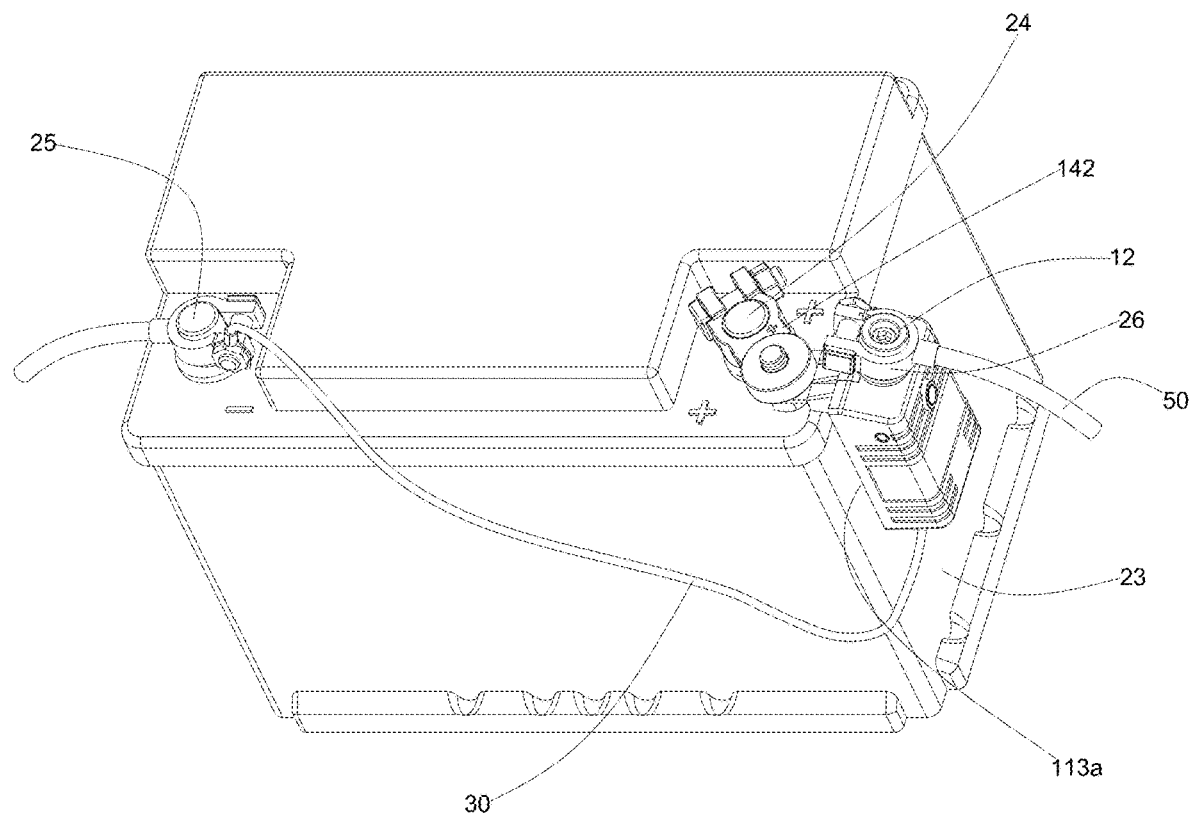
FIG. 6 is an isometric view of an assembly of the battery in FIG. 5 and the low voltage battery protector.

Referring to FIG. 6, when the low voltage battery protector is used, the mounting surface 113a is attached to one of the sides 23 of the battery. One of the battery clamps 26 is electrically connected to the first contact 12, and this battery clamp 26 is electrically connected to an accessory via a wire 50. The clamp 142 of the second contact clamps the positive electrode 24 by fastening the clamp 142. To form a circled circuit, a cable 30 is further provided to electrically connect an internal circuit in the main body of the low voltage battery protector to the negative electrode 25. The mounting surface 113a is attached to the side of the battery by adhesive, or by other mechanical structures.

Referring to FIG. 6 together with FIGS. 1-4, because the connecting portion 141 is rotatable with respective to the supporting portion 13, the user is able to rotate the connecting portion 141 to an adaptive position according to the position of the mounting surface 113a, which provides the user with great flexibility to mount the low voltage battery protector 10. Furthermore, the first contact 12 is configured to form an obtuse angle α with the mounting surface 113a, which provides the user with extra space to operate, i.e., to fix the battery clamp 26 to the first contact 12. Such a configuration of the low voltage battery protector 10 of the present disclosure provides the user with great flexibility and convenience to choose an adaptive position to mount the protector, and provides the user with more space to mount the protector.

Figure 7:
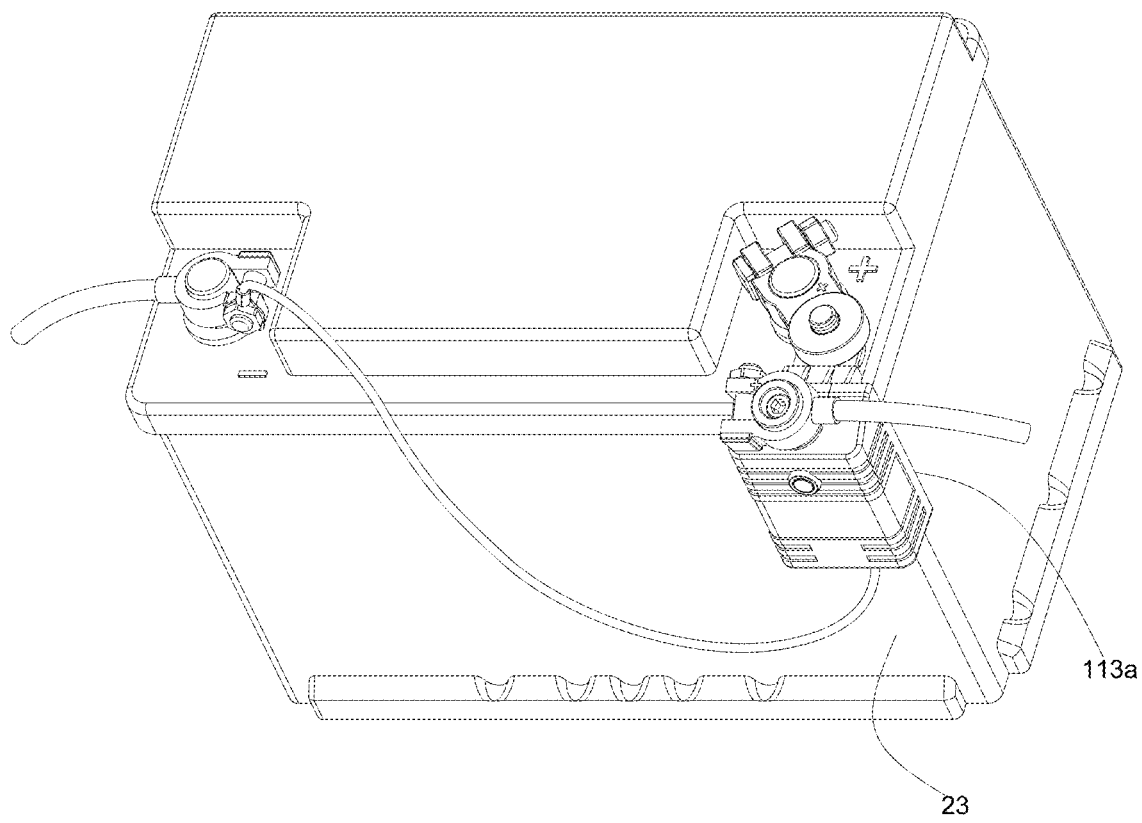
FIG. 7 is an isometric view of an assembly of the battery in FIG. 5 and the low voltage battery protector, where the low voltage battery protector is attached to the battery on a surface different from what is shown in FIG. 6.

Referring to FIG. 7, the mounting surface 113a is attached to another side 23 which is perpendicular to the side where the mounting surface 113a is mounted in FIG. 6. In fact, the user can choose any side to mount the low voltage battery protector.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A low voltage battery protector, interposed between a battery and a cable connected thereto, comprising:
    a main body having an upper end, a lower end substantially opposite to the upper end, and a frame connecting the upper end to the lower end, the frame further including a mounting surface;
    a first contact extending from the top end;
    a supporting portion extending substantially perpendicularly from the mounting surface;
    a second contact assembled with the supporting portion, the second contact including a connecting portion pivotally assembled with the supporting portion.

2. The low voltage battery protector as described in claim 1, wherein the first contact forms an obtuse angle between an axis thereof and the mounting surface.

3. The low voltage battery protector as described in claim 1, wherein the second contact further comprises a clamp extending from the connecting portion and a first fastening member for fastening the clamp.

4. The low voltage battery protector as described in claim 3, wherein the first fastening member includes a screw and a nut.

5. The low voltage battery protector as described in claim 1, wherein the connecting portion is pivotally assembled to the supporting portion by a second fastening member.

6. The low voltage battery protector as described in claim 5, wherein the second fastening member includes a screw and a nut.

7. A battery protection terminal, comprising:
a battery including:
  a top, a bottom opposite to the top, a plurality of sides connecting the top to the bottom;
  a positive electrode and a negative electrode respectively formed on the top;
a low voltage battery protector, comprising:
  a main body having a mounting surface attached to one of the sides;
  a first contact extending from the main body for electrically connecting to an accessory;
  a supporting portion extending perpendicularly from the mounting surface;
  a second contact pivotally connecting to the supporting portion and electrically connecting to the positive electrode.

8. The battery protection terminal as described in claim 7, wherein the first contact forms an obtuse angle between an axis thereof and the mounting surface.

9. The battery protection terminal as described in claim 7 further including a cable electrically connecting an internal circuit in the main body to the negative electrode.

\* \* \* \* \*